United States Patent
Bove et al.

(10) Patent No.: US 9,597,590 B2
(45) Date of Patent: Mar. 21, 2017

(54) METHODS AND APPARATUS FOR ACCESSING PERIPHERAL CONTENT

(75) Inventors: Victor Michael Bove, Wrentham, MA (US); Santiago Alfaro, Cambridge, MA (US); Vincent Lee, Cranston, RI (US)

(73) Assignee: Massachusetts Institute of Technology, Cambridge, MA (US)

( * ) Notice: Subject to any disclaimer, the term of this patent is extended or adjusted under 35 U.S.C. 154(b) by 309 days.

(21) Appl. No.: 13/433,020

(22) Filed: Mar. 28, 2012

(65) Prior Publication Data

US 2012/0249424 A1 Oct. 4, 2012

Related U.S. Application Data

(60) Provisional application No. 61/470,706, filed on Apr. 1, 2011.

(51) Int. Cl.
*A63F 13/26* (2014.01)
*A63F 13/525* (2014.01)
*A63F 13/211* (2014.01)
*A63F 13/213* (2014.01)

(52) U.S. Cl.
CPC ............ *A63F 13/26* (2014.09); *A63F 13/211* (2014.09); *A63F 13/525* (2014.09); *A63F 13/213* (2014.09); *A63F 2300/105* (2013.01); *A63F 2300/1062* (2013.01); *A63F 2300/1093* (2013.01); *A63F 2300/301* (2013.01); *A63F 2300/409* (2013.01); *A63F 2300/6661* (2013.01)

(58) Field of Classification Search
None
See application file for complete search history.

(56) References Cited

U.S. PATENT DOCUMENTS

| | | | | |
|---|---|---|---|---|
| 5,495,576 | A | * | 2/1996 | Ritchey .......................... 345/420 |
| 6,567,984 | B1 | * | 5/2003 | Allport .......................... 725/110 |
| 7,480,003 | B2 | * | 1/2009 | Okawara ............ H04N 5/23212 |
| | | | | 348/347 |

(Continued)

OTHER PUBLICATIONS

Tsekleves, E., et al. (2007) Interacting with Digital Media at Home via a Second Screen. In ISMW '07 Proceedings of the Ninth IEEE International Symposium on Multimedia Workshops, pp. 201-206, IEEE Computer Society Washington, DC, USA 2007.

(Continued)

*Primary Examiner* — Jennifer Mehmood
*Assistant Examiner* — Parul Gupta
(74) *Attorney, Agent, or Firm* — Stephen R. Otis

(57) ABSTRACT

In exemplary implementations of this invention, a main content feed is displayed on a main screen. A user may select one or more auxiliary feeds of content to display simultaneously on a second screen. The second screen is located on a handheld device. The user makes the selection by changing the orientation of the handheld device relative to the main screen. For example, the user may select which auxiliary feed to display by pointing the device at different areas that are around the periphery of the main screen. The handheld device includes one or more sensors for gathering data, and one or more processors for (a) processing the sensor data to calculate the orientation of the handheld device relative to the main screen and (b) based at least in part on that orientation, selecting which of the auxiliary feeds to display.

20 Claims, 7 Drawing Sheets

(56) References Cited

U.S. PATENT DOCUMENTS

| | | | |
|---|---|---|---|
| 7,757,254 B2 | 7/2010 | Shoff et al. | |
| 8,462,109 B2* | 6/2013 | Nasiri et al. | 345/158 |
| 2003/0216179 A1* | 11/2003 | Suzuki et al. | 463/35 |
| 2004/0119815 A1* | 6/2004 | Soloff | H04N 5/445 348/39 |
| 2006/0152487 A1* | 7/2006 | Grunnet-Jepsen | G06F 3/0346 345/158 |
| 2009/0199231 A1 | 8/2009 | Tsuria et al. | |
| 2010/0053467 A1* | 3/2010 | Maxson | H04B 10/1141 348/734 |
| 2010/0267448 A1* | 10/2010 | Snoddy | A63F 13/12 463/30 |
| 2011/0190061 A1* | 8/2011 | Takeda | A63F 13/02 463/39 |
| 2012/0028701 A1* | 2/2012 | Gomez | G07F 17/3211 463/25 |
| 2012/0050507 A1 | 3/2012 | Keys | |

OTHER PUBLICATIONS

Cesar, P., et al. (2008) Usages of the Secondary Screen in an Interactive Television Environment: Control, Enrich, Share, and Transfer Television Content. In Proceedings of 6th European Conference, EUROITV 2008, Salzburg, Austria, pp. 168-177, 2008.

Ursu, M., et al. (2008) Interactive TV narratives: Opportunities, progress, and challenges. ACM Transactions on Multimedia Computing, Communications, and Applications (TOMCCAP), vol. 4 Issue 4, Oct. 2008, Article No. 25, ACM New York, NY, USA.

* cited by examiner

METHODS AND APPARATUS FOR ACCESSING PERIPHERAL CONTENT

RELATED APPLICATIONS

This application claims the benefit of U.S. Provisional Application Ser. No. 61/470,706, filed Apr. 1, 2011, the entire disclosure of which is herein incorporated by reference.

FIELD OF THE TECHNOLOGY

The present invention relates generally to television and display screens.

SUMMARY

In exemplary implementations of this invention, a main channel of content is displayed on a main screen. A user may select one or more feeds to display simultaneously on a second screen. For example, a user may select one or two feeds at a time to display on the second screen. The second screen is located on a handheld device.

The user makes the selection by changing the orientation of the handheld device relative to the main screen. For example, the user may select which auxiliary feed to display by pointing the device at different areas that are around the periphery of the main screen. The handheld device includes one or more sensors for gathering data, and one or more processors for (a) processing the sensor data to calculate the orientation of the handheld device relative to the main screen and (b) based at least in part on that orientation, selecting which of the auxiliary feeds to display.

For example, the channel displayed on a main screen may display a main plot. A viewer may select an auxiliary channel that follows an individual character or a particular, additional subplot.

Or, for example, the channel displayed on the main screen may display a sporting event. The user may select an auxiliary feed that follows a particular player or focuses on some particular aspect of the sporting event.

Or, for example, the channel displayed on the main screen may show a portion of a room. A viewer may point the handheld device in various directions to view auxiliary channels that show other portions of the room. For example, a viewer may do so in order to discover clues relating to a mystery that is the subject of the display on the main channel.

In some implementations, a viewer may explore different views from a particular vantage point. To do, the viewer may point the handheld device at different portions of a sphere or circle that surrounds the viewer. This has the effect of selecting corresponding angles of view from the particular vantage point. For example, in order to explore different views from the vantage point of a trapeze artist standing on a platform at the top of a pole in a circus, a viewer may point the handheld device in corresponding directions around the viewer.

Alternately, to explore different parts of a 2D plane from a particular vantage point, a viewer may point the handheld in corresponding directions towards a corresponding 2D plane in front of the viewer.

Each "tile" of such a sphere, circle or 2D plane may be a different feed.

In some implementations, as the viewer explores different angles of view, the second screen may show only one feed at a time, jumping from one "tile" of the view to the next as the angle of view changes. Or, for example, the second screen may move continuously through different "tiles" of the view. For example, the second screen may at a specific moment show two tiles at the same time, as the angle of viewing moves toward one of the tiles and away from the other of the tiles.

In some implementations, one or more processors may modify incoming feeds to geometrically transform images in the feeds. For example, such a geometric transform may be used to create a transition from one view to another, or to change the angle of viewing or vantage point, or to create a panorama of multiple views.

The visual display of a channel may be supplemented by audibly outputting the audio portion of the channel.

A channel may comprise any channel or feed, including a channel that is transmitted wirelessly or by wired connection. For example, a channel may comprise a conventional broadcast channel (e.g., TV) or a channel transmitted over the Internet, including by file sharing protocol. The channel may comprise content stored in computer memory, which content was received from a channel previously transmitted by any method of transmission.

Alternately, in some implementations, either the main feed or the auxiliary feeds may be projected onto a remote wall or other surface, instead of being displayed on an electronic display screen.

The above description of the present invention is just a summary. It is intended only to give a general introduction to some illustrative implementations of this invention. It does not describe all of the details of this invention. This invention may be implemented in many other ways.

Figure 1:
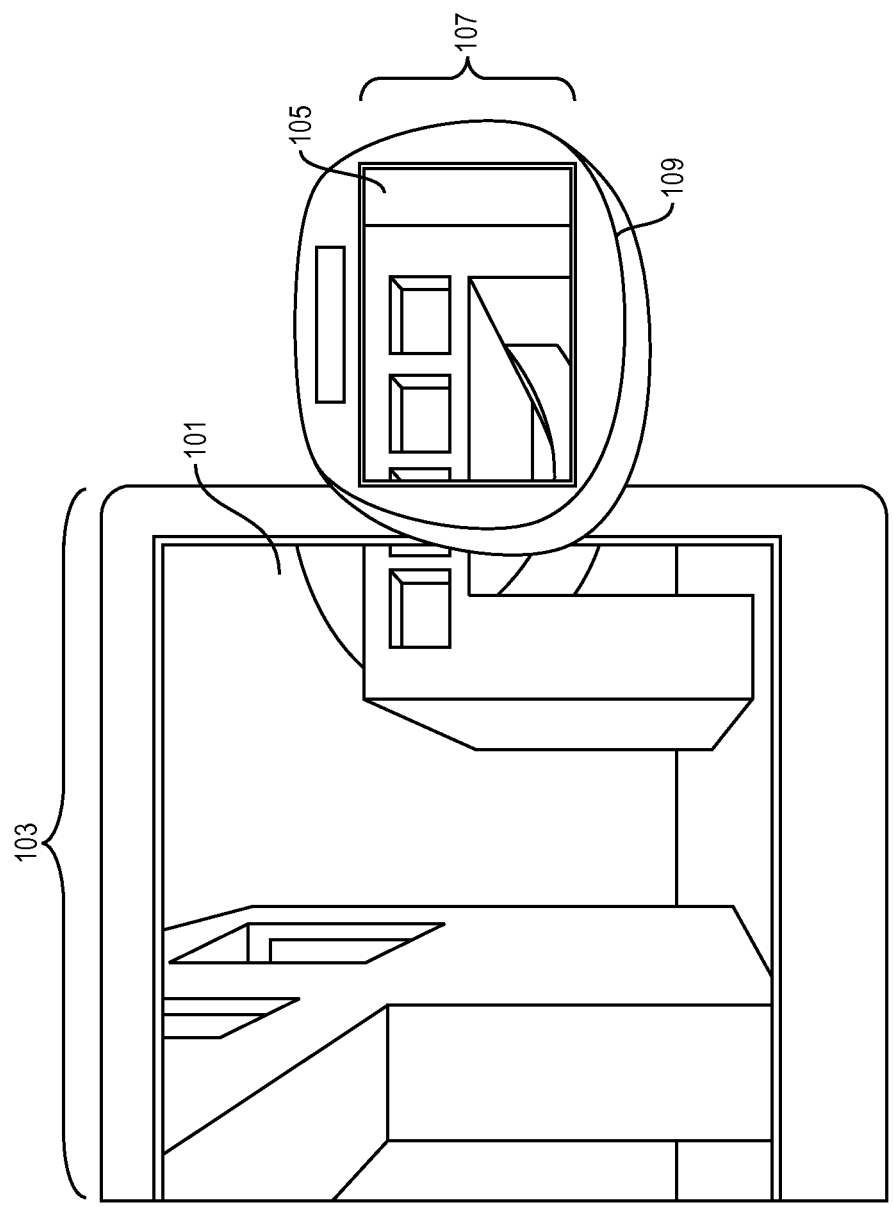
FIG. 1 shows a main image displayed on a main screen, and a second image displayed on a second screen in a handheld device. The second image extends the main image beyond the frame of the main screen.

The above Figures illustrate some illustrative implementations of this invention, or provide information that relates to those implementations. However, this invention may be implemented in many other ways. The above Figures do not show all of the details of this invention.

DETAILED DESCRIPTION

If one thinks of a television set as a window into another world, then whatever one sees through it could be assumed to continue past the edges of the TV. If the TV shows a forest scene, then to the sides of the TV one should be able to find the continuation of this forest, meaning more trees and perhaps a stream, a path and even some birds and squirrels.

In exemplary implementations of this invention, a system situates the viewer at the center of a surround space. In this system, the main program is augmented with content that is specifically created for spatial continuity or other perceptual effect, and the viewer can use a hand-held navigational device with a viewing screen to access this secondary source of information, even while keeping an eye on the main screen. This system transforms the TV-watching experience into an immersive activity and allows the viewer to explore and construct a more complete picture of what is happening "off screen" or on the "other side" of the screen. The main interface to this system is a handheld device that gives the viewer a way to access this extra content so that he/she may choose the point of view with relation to the content on the main screen and the viewer's position relative to the screen. For example, the secondary channel may show related views or expanded narrative threads. Using this system, the viewer can be an explorer rather than a spectator and can take a more active role in the unfolding of the story.

In exemplary implementations, the user can select any one of multiple simultaneous feeds to display on the handheld device. This selection can be made by changing an orientation of the handheld device relative to the main screen (which is remote from the handheld device. Consider the following example: a main screen displays a first feed, and a user can select any of three auxiliary feeds to display (one auxiliary feed at a time) on a second screen, which is located on the handheld device. To select which of the auxiliary feeds to display on the handheld device, the user changes the orientation of the handheld device—e.g., "points" the device in different directions. For example, the user could select one of the three auxiliary feeds by pointing the device at one of three different areas that are located around (or adjacent to) the perimeter of the main screen.

In exemplary implementations, the device may be pointed while the screen of the device remains perpendicular to the angle of viewing of the user (thus allowing easier viewing). For example, the handheld device may be a smart phone and the smart phone may be treated as "pointing" in the direction of a line that intersects the center of the smart phone screen and is perpendicular to that screen. In that case, the user could change the direction in which the device is pointed by holding the device in front of the user, and simply rotating his entire body. Or the user could hold the device with an arm, and without changing the angle of the fingers, wrist or elbow, rotate that arm relative to the user's body (by rotating the arm about the shoulder joint). Either rotation could be done while the screen of the smart phone remains perpendicular to the user's angle of vision at all times.

In exemplary implementations of this invention, a first screen can function as a shared device and a second screen can function as a personal device. When the TV experience is split into two spheres of usability (shared and personal), the field of TV entertainment suddenly derives new potential for interactivity and social, shared construction of story.

In exemplary implementations of this invention, the user experience may be that of: (1) generating a different world, or (2) simply viewing a different world through the perceived window of a hand-held screen.

In exemplary implementations of this invention, one story is streamed to the main TV screen; but a second layer of content such as parallel synchronous scenes that relate to the story flow can be accessed around the edge of the screen by each individual viewer via a hand held device.

In exemplary implementations of this invention, more than one person can use this system. For example, multiple persons can explore and share their discoveries about the story world. For example, in an illustrative embodiment in which this invention is used as a gaming platform, multiple players can choose to work together and combine their efforts by dividing the virtual space, i.e. "you look on that side of the room while I look on this side," to accomplish whatever the objective of the game might be.

The type of handheld device that is used may vary. In some implementations, a device designed specifically for the system may be used. In other implementations, an existing handheld device (such as a cell phone or tablet) may be used, in some cases after adding sensors and processing power.

An advantage of creating a new device specifically for the system is control of the form factor to allow for direct targeting of specific audiences. For example, a form factor targeted for a preschool audience may have a small, light screen, and may be adapted for children to use it to play an exploration game with a character in the TV screen. This device could have grips, colors and textures more suitable for the wear and tear expected from a preschooler. An older generation that is not very familiar with high-end cell phone devices might feel more comfortable with a design that requires less controls and configurations and might even resemble an old-style magnifying glass or a pair of opera glasses.

Conventional TV watching can be a shared experience. With conventional TV, when more than one person is in the room, there is no way to have an individual experience unless multiple screens and tuners are in place.

However, an exemplary implementation of this invention provides two channels for the story experience. The main program content may appear on the traditional "shared" TV screen. The secondary, surround content, may be accessed by directing a secondary personal hand held device. This mode allows each user to control what and how they watch the program. Dividing the activity in this way, users can access elements of the program that are not part of the main program stream without affecting the viewing of the other viewers who may also be watching the main program in the same space. This may provide a comfortable and personal experience, in which: (1) viewers have different but complimentary experiences, and (2) users can share, compare and compliment each of their experiences with that of their fellow watchers.

In exemplary implementations of this invention, a full TV story is revealed through exploration of the surrounding space. The system encourages the viewer to take a more active role when watching TV. The system may convey extra information that compliments the experience by making it closer to a live event or simply by giving a feeling of control to the viewer.

In exemplary implementations, a user can access interactive TV services through a second screen. This is advantageous, because users may prefer to not waste the "real estate" of a main screen with interactive features but may be more than willing to interact with the secondary device.

In exemplary implementations of this invention, the handheld device can orient itself with relation to the main screen in any context, using an inertial sensor.

In some implementations, a camera mounted on the handheld device provides data indicative of the handheld device's orientation, position or motion. The camera captures visual images of scenes in the vicinity of the handheld device, and the images are analyzed to help determine the orientation, position or motion of the handheld device, including relative to the main screen. The handheld device may house processors to do all or some of the processing and computation. In some implementations, part of the processing and computation is done by processors that are remote from the handheld device.

FIGS. 1 to 6 show exemplary implementations of this invention.

FIG. 1 shows a main image 101 displayed on a main screen 103, and a second image 105 displayed on a second screen 107 in a handheld device 109. The second image extends the main image beyond the frame of the main screen.

Figure 2:
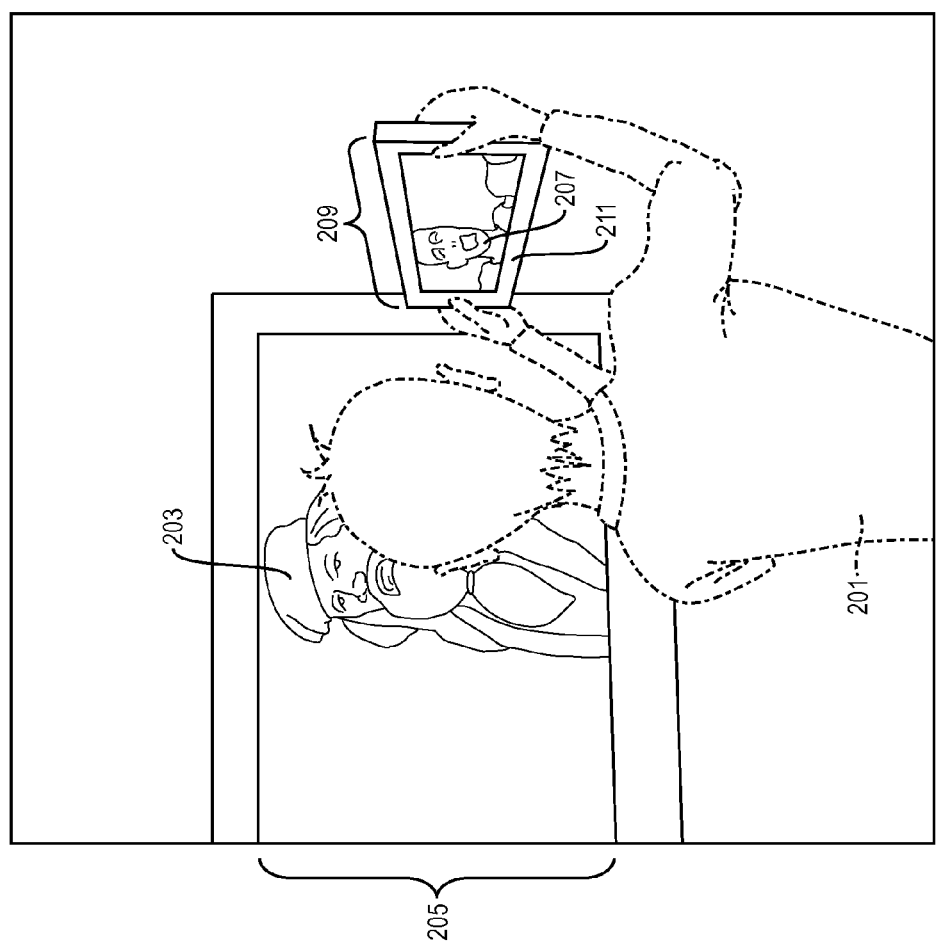
FIG. 2 shows a viewer watching a scene from a main plot that is displayed on a main screen while also keeping an eye on a different scene that is displayed on a second screen.

FIG. 2 shows a viewer 201 watching a scene 203 from a main plot that is displayed on the main screen 205 while also keeping an eye on a different scene 207 that is displayed on a second screen 209. The second screen 209 is included in a handheld device 211 that the viewer 201 is holding.

Figure 3:
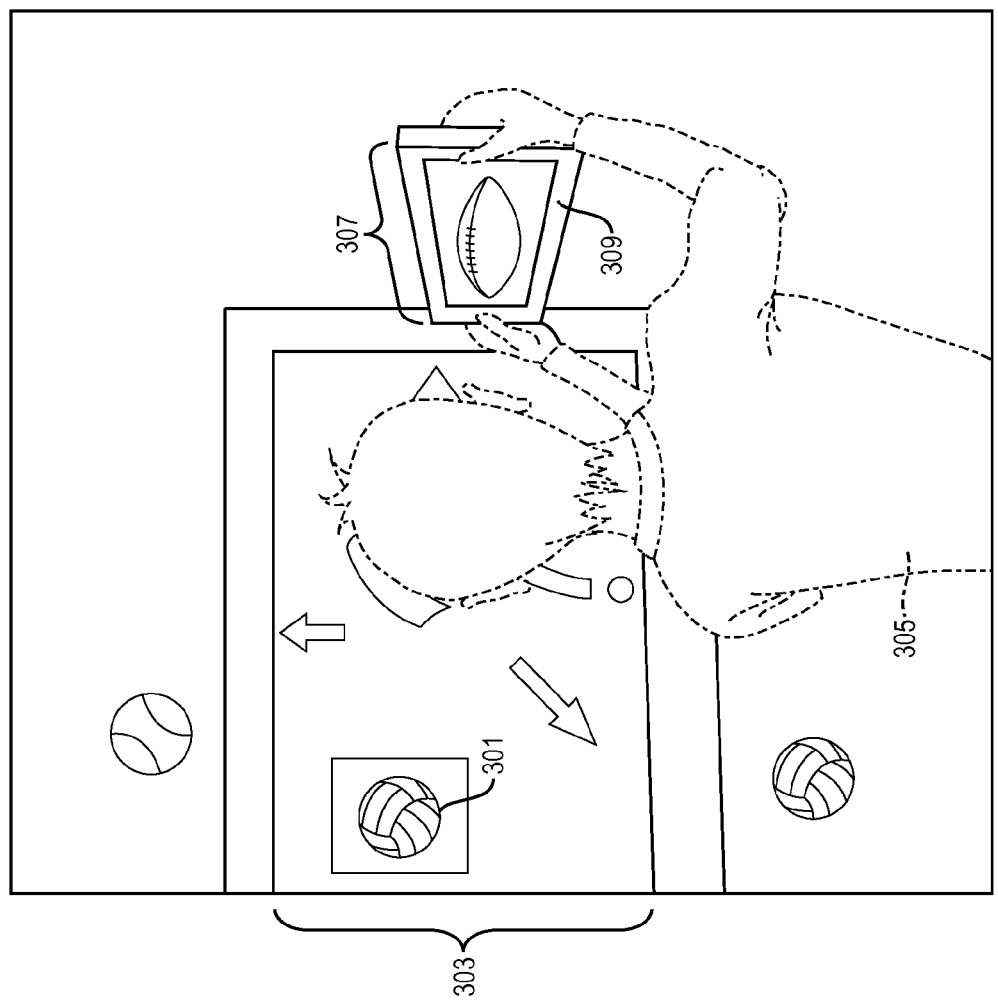
FIG. 3 shows a first item displayed on a main screen, and a viewer trying to find, in one of multiple auxiliary feeds, a second item that matches the first item. The second item is hidden in one of multiple auxiliary feeds that may be displayed by a second screen housed in a handheld device.

FIG. 3 shows a first item 301 displayed on a main screen 303, and a viewer 305 trying to find, in one of multiple auxiliary feeds, a second item that matches the first item. The second item is hidden in one of multiple auxiliary feeds that may be displayed by a second screen 307 housed in a handheld device 309.

Figure 4:
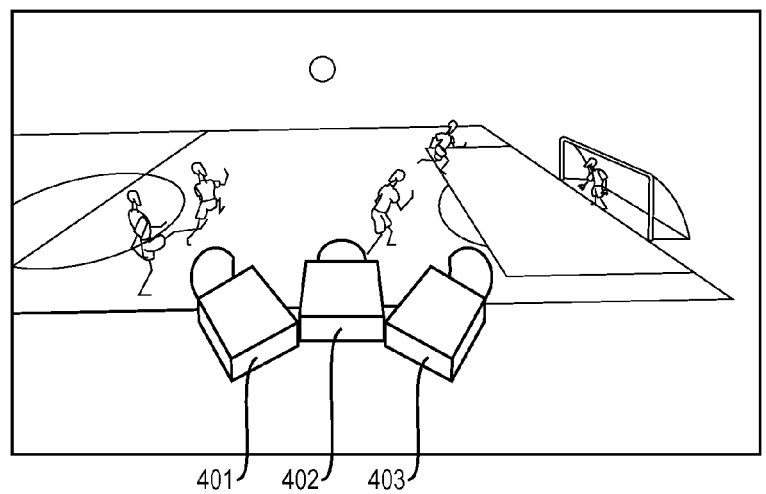
FIG. 4 shows many cameras to choose from when watching a live sporting event from home.

FIG. 4 shows many cameras 401, 402, 403 to choose from when watching a live sporting event from home.

Figure 5:
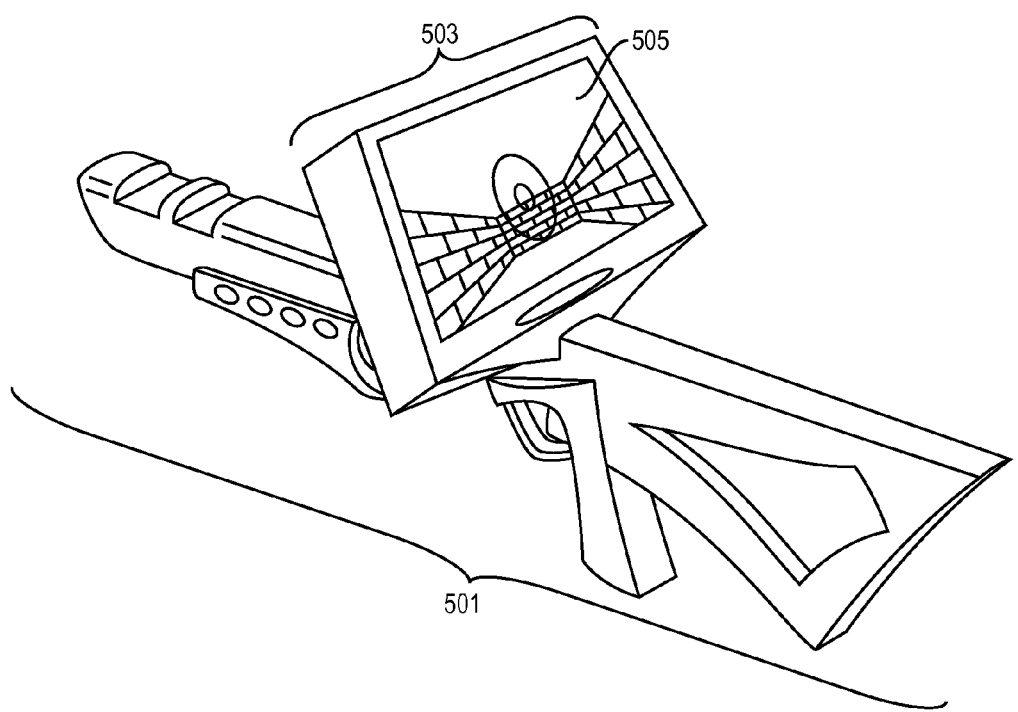
FIG. 5 shows a physical, handheld "rifle" adapted to be held and "shot" by a player in a video game. The "rifle" includes a display screen for displaying the virtual view that is in front of the player in the video game.

FIG. 5 shows a physical, handheld "rifle" 501 adapted to be held and "shot" by a player in a video game. The "rifle" 501 includes a display screen 503 for displaying the virtual view 505 that is in front of the player in the video game. This view is in addition to a main screen (not shown) for the video game, which main screen may be viewed by any of multiple players in the video game.

Figure 6:
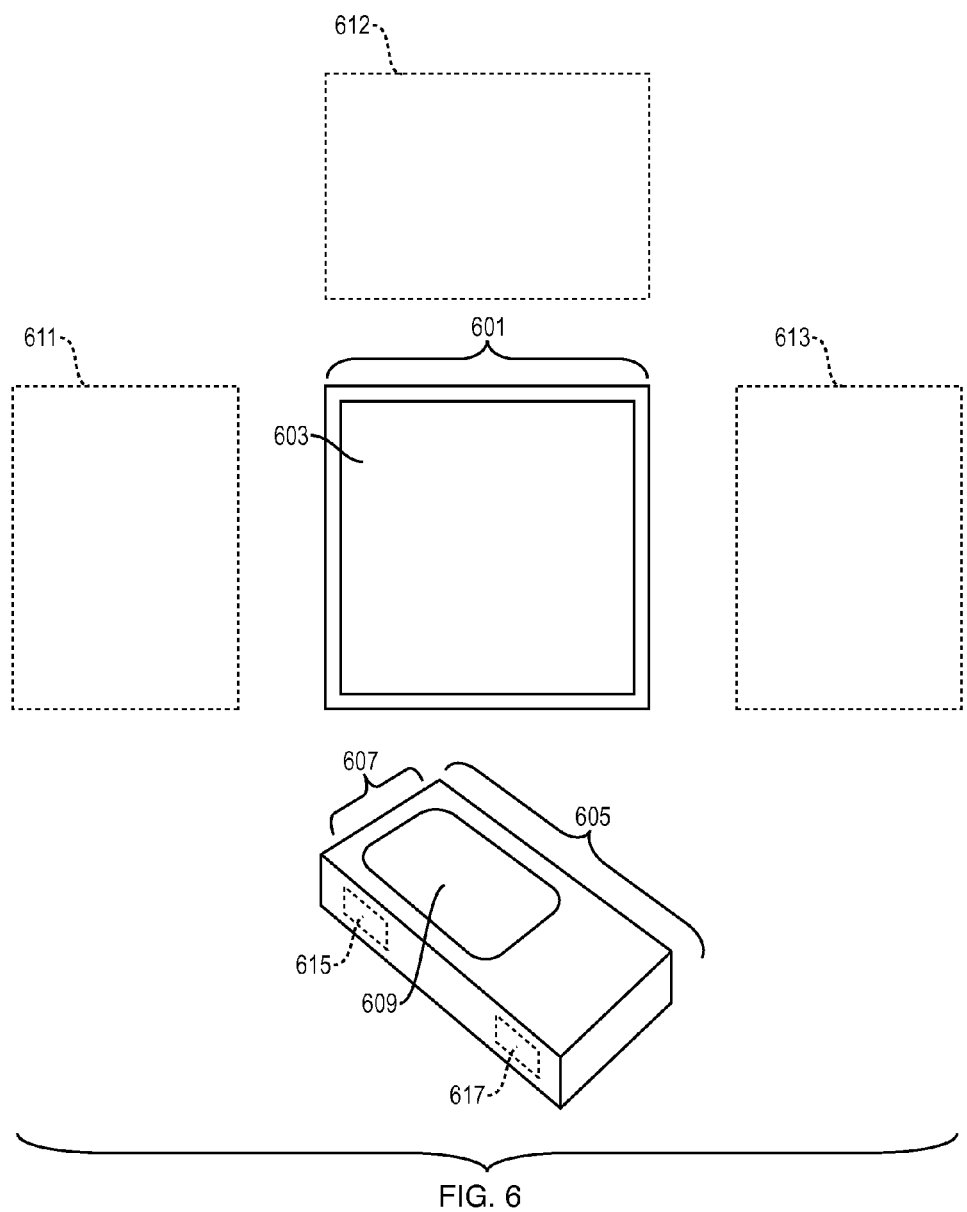
FIG. 6 is a high level block diagram of hardware components that may be used in a viewing system.

FIG. 6 is a high level block diagram of hardware components that may be used in a viewing system. As shown in FIG. 6, a main screen 601 displays a main channel of content 603. A handheld device 605 includes a second screen 607 that displays an auxiliary feed of content 609. A user may select any of multiple simultaneous auxiliary feeds of content to display on the second screen 607. The user can make the selection by changing the orientation of the handheld device 605 relative to the main screen 601. For example, the user may select which auxiliary feed to display by pointing the handheld device 605 at any of a set of different areas 611, 612, 613, that are around the periphery of the main screen. The handheld device 605 includes one or more sensors 615 for gathering data, and one or more processors 617 for (a) processing the sensor data to calculate the orientation of the handheld device relative to the main screen and (b) based at least in part on that orientation, selecting which of the auxiliary feeds to display.

Figure 7:
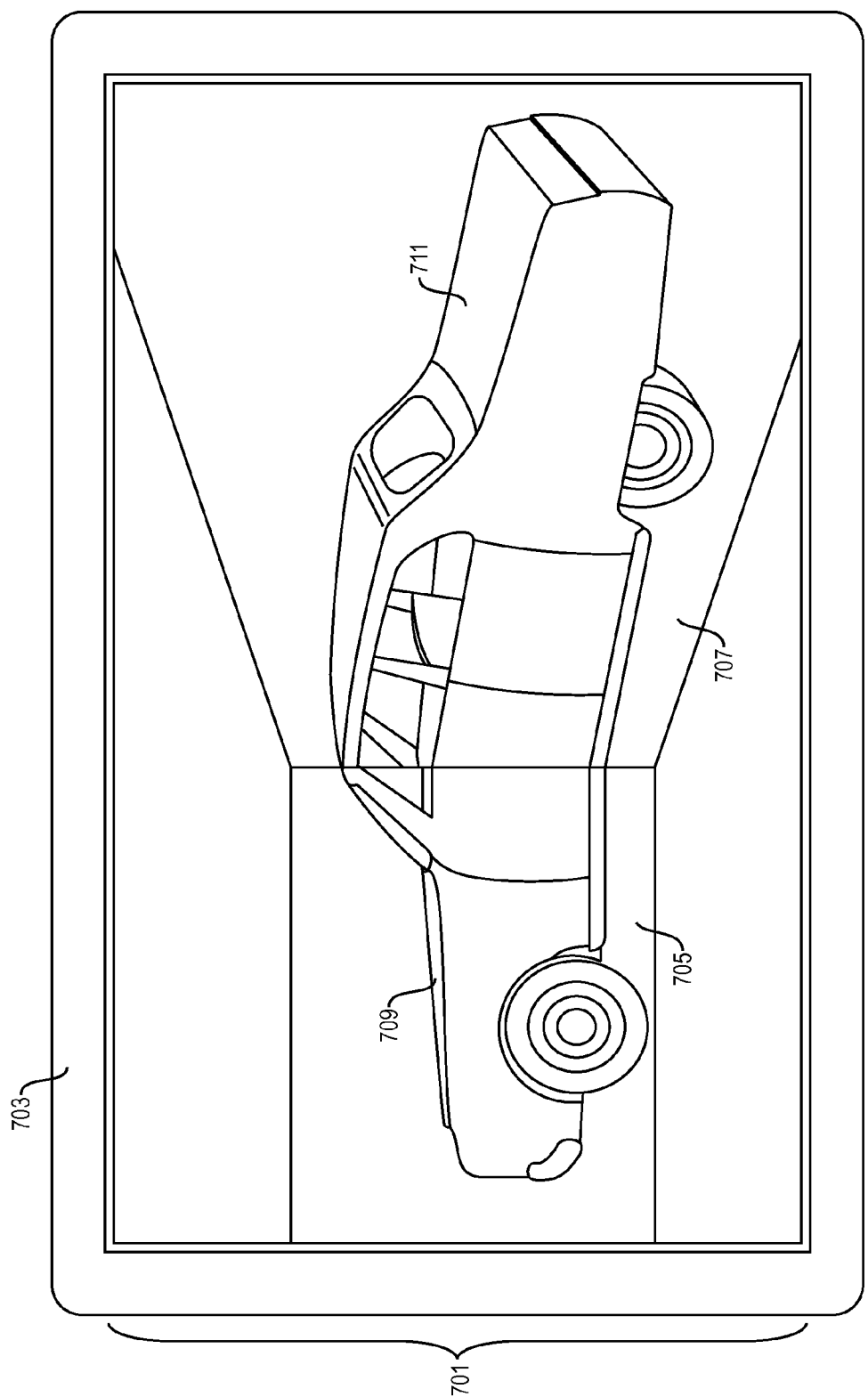
FIG. 7 shows a screen on a handheld device. The screen is displaying two feeds at the same time. The two feeds show two different parts of the same car, seen from different viewing angles.

FIG. 7 shows a screen 701 on a handheld device 703. The screen 701 is displaying two feeds 705, 707 at the same time. The two feeds 705, 707 show two different parts 709, 711 of the same car, seen from different viewing angles.

Figure 8:
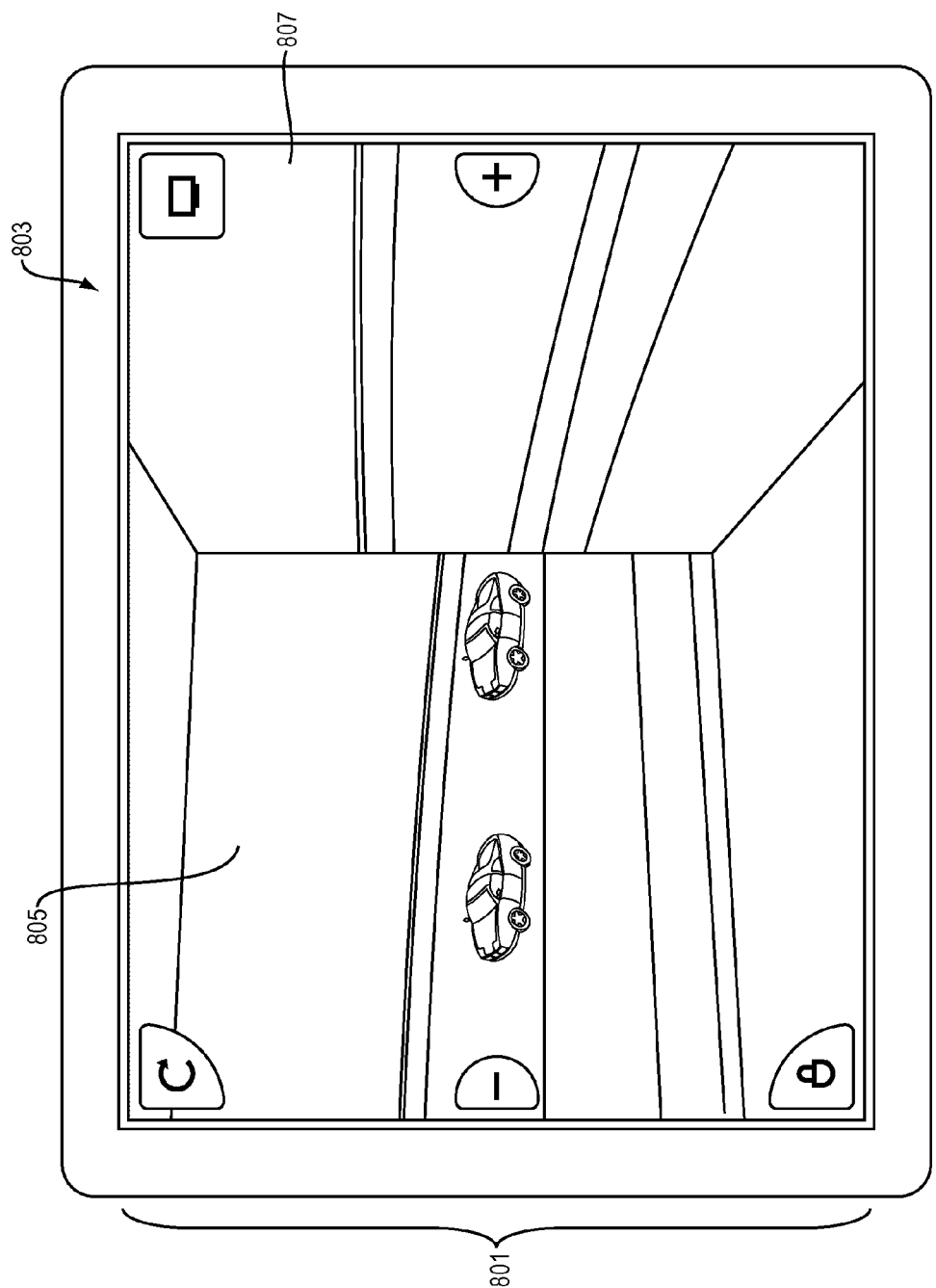
FIG. 8 shows a screen on a handheld device, displaying a car race. The screen is showing two feeds at the same time. The two views are from about the same vantage point, but at viewing angles that differ by about 90 degrees.

FIG. 8 shows a screen 801 on a handheld device 803, displaying a car race. The screen is showing two feeds 805, 807 at the same time. The two feeds 805, 807 show views that are from about the same vantage point, but at viewing angles that differ by about 90 degrees.

In exemplary implementations of this invention, a magnetometer and one or more accelerometers, gyroscopes or IMUs are included in the handheld device. The magnetometer measures the horizontal angle (i.e., compass heading) of the handheld device relative to the main screen. (In this context, the "main screen" is the screen that is remote from the handheld device and that displays the main feed). The one or more accelerometers, gyroscopes or IMUs measure the handheld device's vertical angle (tilt).

In exemplary implementations, the magnetometer can be initially calibrated (to determine the compass heading of the main screen) by the human user pointing the handheld device at the main screen. In that case, input is received from the user which indicates that the user is performing this calibration step, and a magnetometer reading taken at (or very shortly before or after) the time of the input indicates the compass heading of the main screen. For example, the input may comprise transducer data indicating that the user is pressing a button.

Alternately, the magnetometer can be initially calibrated by (1) using a camera mounted in the handheld device to capture visual data, and (2) using one or more processors (i) to analyze the visual data to identify a visual tag located at or adjacent to the main screen and (ii) to determine the magnetometer reading (compass heading) when the handheld device is pointed toward the visual tag. If the camera is used, recalibration can be done whenever the camera happens to be pointed toward the visual tag again. The visual tag can be displayed on the main screen or can be affixed at or adjacent to the screen.

In a first prototype of this invention, the handheld device comprises a Samsung® tablet, a sensor chip and an Arduino® Duemilanove board. A bracket is used to displace the sensor chip from the tablet to avoid magnetic interference. The sensor chip comprises a Compass Module with Tilt Compensation (HMC 6343 from Honeywell®, Morristown, N.J.) that communicates through i2c. The Arduino® board has a USB interface to both power the sensor and communicate its data to the computer through Serial Port. The sensor chip sends a constant stream of tilt, rotation and heading Serial values that is interpreted by the Arduino® board and sent as ASCII values to the tablet. The tablet receives the ASCII values through the virtual parallel port of the USB connection.

In a second prototype of this invention, the handheld device comprises an Apple® iPad®. Advantageously, the iPad® comes with inertial sensors, and the size, weight and screen size are well-suited for some embodiments of this invention. Also, the operating capacity of the iPad® is more than enough to handle the video processing at the same time with the sensor data and the wireless data transfers. In the second prototype, Unity 3D® is used as a software developing platform. In the second prototype, when the main screen changes channel, the handheld device also changes channel.

In a third prototype of this invention, the handheld device again comprises an iPad®, but the software includes HTML5, which allows a video tag creating, browser supported, video without having to resort to other programs such as Adobe Flash®. HTML5 also allows for 3D transform of images, creating perspective views that can be displayed on the secondary screen. Software in the third prototype includes a framework in HTML5 with an array of video tags. However, HTML5 does not support accelerator data. To solve this problem, an application is written inside another application. The inside application, written in HTML5 and Java Script®, handles the graphics and videos. The outside application is written in Objective C and handles and transmits the sensor data. In the third prototype. VLC reads a video file and exports MJPGs to the browser in the iPad®. Since the MJPGs are just images that rapidly change, the iPad allows simultaneous playback. With HTML5, 3D transforms are possible. Any one of multiple simultaneous streams of videos may be selected. The selected stream may be displayed on the screen of the handheld device with accurate control through the sensors in the hardware.

In exemplary implementations of this invention, a feed is displayed on a main screen, and in addition a user may select any of multiple simultaneous feeds, in order to supplement the content provided on the main screen.

Different types of content can be displayed in the feeds. Here are some examples:

In a prototype of this invention, three video feeds were used. The content for these three feeds were created as follows: Three video cameras were set up next to a busy street. The cameras were placed so that the field of view of one camera ended roughly where the field of view of the one next to it started, in order to create a continual image once the videos were placed together in the system. The camera on the right could capture a car approaching in the distance; the camera in the center could capture the car passing from right to left, and the left camera could capture the car heading off in the distance. The main screen shows the footage from the center camera only. By using the handheld device, the user is able to switch from camera to camera, side to side, and see what was going to happen before it occurred on the main screen, effectively giving a sense of having more information about the scene than the user would have without the system.

Also, in a prototype of this invention, DVD footage that shows the same scene from different camera angles is employed.

Also, in a prototype of this invention, the content comprises TV footage of a game show taped in front of a live audience. In the game show, two teams competed against each other in answering general knowledge questions. Four TV cameras were used to record the show, three that were dedicated to the host and the teams, respectively, and a fourth that would pan over the set giving aerial views as well as flythrough views of the audience. Thus, the cameras created the same synched footage. In an exemplary implementation of this invention, the game show as actually aired is displayed on the main TV screen, and the handheld device can be used to access (one feed at a time) the feeds showing the teams (one on each side of the TV) and the general panning camera in the center. With this the users can follow the show as they would at home while complementing it with additional camera angles.

Also, in a prototype of this invention, the content comprises TV footage of a NASCAR race. The footage includes camera feeds from various angles. In the first feed, the camera follows the race going from the first car to the last. The other feeds focus more on specific cars or groups of cars, such as the two leaders and the cars in third and fourth place, etc. In an exemplary implementation of this invention, the first feed is displayed on the main screen and the user can access any of the other feeds using the handheld device. Thus, in exemplary implementations, a user can use the handheld device to choose a particular car to follow, or even to just pan through the views of all cars and see details that would have been impossible to catch before.

In exemplary implementations of this invention, the handheld device may include one or more optional features. Here are some examples of such features:

In exemplary implementations, the handheld device may have zooming capabilities. Input that triggers a zoom may comprise, for example, either: (a) pinching the screen or (b) moving the handheld device away or towards the body. Two types of zoom may be performed. The first type (a so-called "video zoom") allows a user to get closer to the action in any one of the peripheral feeds. For example, the main screen can show some video and the secondary screen can operate like a magnifying glass or a pair of binoculars getting closer to the action. The second type (a so-called "system zoom") is a navigation feature in which a virtual camera drops back revealing all the peripheral windows at the same time. This way, a quick glance would let the user choose the most interesting of the cameras at that moment, and then quickly zoom back in, centering on that camera. This system zoom can improve usability and reduce the need to actively explore all the cameras.

In exemplary implementations, the handheld device may be used for playback, including the ability to fast-forward, rewind, pause, etc.

In exemplary implementations, the handheld device may allow a user to manually scroll through different camera angles. This ability facilitates the user's exploration of the peripheral content.

In exemplary implementations, a small icon may show the location of the camera that is supplying the feed being shown on the handheld device. This icon may be included in the image displayed by the handheld screen (or the image displayed by the main screen). This icon helps the spatial understanding of the scene. For instance, if a user is watching a boxing event, icons for the respective cameras could be around the ring and the user could understand the location of the camera that is supplying the feed being shown on the handheld device.

In exemplary implementations, the user may be presented with a menu, to give the choice of which camera to watch through different cameras, e.g., Cam1, Cam2, Cam3, and so on. For example, the menu could place the chosen camera in the center without the need to move around. When a camera is chosen, a graphical user interface (GUI) can give cues with arrows or some other graphical device to show where the user should turn the handheld device to see the desired camera. (By changing the orientation of the handheld device, the user can select different feeds to display on the handheld device). The menus can also give the choice of what in particular to focus on. For example, a user could be interested in how the cameras are rigged or how the lighting in the set was placed, so the menu could suggest and orient the user towards views that would show a specific feature of the content.

In exemplary implementations, the system may audibly output one or more audio feeds associated with one or more of the channels, respectively, displayed on the screens. Sound can be a great way to attract the user's attention to what may be happening in other screens. With sound, the curious user will be interested in exploring his or her surroundings.

In illustrative embodiments, this invention has many practical applications. Here are some examples:

A viewer can watch the main plot of a story unfold on the main screen while also keeping an eye on a different character on the second screen.

A viewer can try to answer a puzzle presented on the main screen, by finding clues hidden in auxiliary feeds that can be accessed on the second screen.

A viewer can choose to display any of many camera feeds, to supplement the main broadcast of a sporting event.

Different groups of viewers may keep watch on different characters or story lines that pass in and out of the main frame. This way a story that might seem fragmented can be put together through later conversation by the viewers.

Information can be hidden outside the frames of the main screen for the viewer to find and complete tasks towards a goal. Educational programs for children can hide clues and different objects that the children may have to identify among similar objects.

With the aid of a graphical interface, the system may behave as zoom glasses, or special filter scopes to reveal fingerprints or stains that will help resolve a murder By selecting different auxiliary feeds to view, a viewer may witness the context in which the content was created. For example, the set, lighting, sound technicians and director could come into view as they work on the content being displayed at that moment.

Two users who each have this system may interact by using it to look to the sides and see each other while they are each in their own houses. This telepresence is not tied to the content on the main screen.

A viewer can look at an auxiliary feed to see images that correspond to the sounds that come at one time from a point outside the main screen's boundaries. A sound channel on the device may also change with the position of the handheld device in order to give the local sound corresponding to the view on the second screen.

A user can play a video game in which the some information is displayed on a main screen (where it can be viewed by all of the players), and the user can learn additional information from a feed displayed on a screen of a physical "gun" held by the user. The user can "shoot" the gun, and the shots can occur virtually in the video game. For example, the main screen can show a shared view, for example the map of the space being explored with markers showing the location of each player. In turn, the handheld device can show the forward view of each player so the player will have to turn his or her body in order to be aware of the immediate surroundings, bringing a level of realism to the game.

DEFINITIONS AND CLARIFICATIONS

Here are a few definitions and clarifications. As used herein:

The term "or" is an inclusive disjunctive. For example "A or B" is true if A is true, or B is true, or both A or B are true.

The terms "a" and "an", when modifying a noun, do not imply that only one of the noun exists. For example, if a set includes "a" red member, then the set includes one or more red members.

To "audibly output" a channel means to audibly output content that is included in that channel. For example, audible output of audio content included in a television channel would comprise an audible output of that channel.

The term "channel" shall be construed broadly, and is not limited to a television channel or to any particular method of transmission. For example, a "channel" includes any stream or feed, whether broadcast wirelessly or by wired connection. Also, for example, a "channel" may be transmitted by traditional broadcasting (including television or radio) or over the Internet. Also, for example, a "channel" may be transmitted by a file sharing protocol, including by a peer-to-peer file sharing protocol. Also, for example, a "channel" may comprise a television channel or other channel that includes audiovisual content. Also, for example, a "channel" may comprise content stored in electronic memory, which content was received in a channel transmitted by any method of transmission.

The term "content" shall be construed broadly, and includes any data, including any data representative of sounds or visual images.

To "display" a channel is to display at least some of the visual content included in that channel.

The term "example" means a non-exclusive example. When an example is given, there is no implication that the given example is the only instance of what is exemplified. Likewise, when multiple examples are given, there is no implication that the given examples are the only instances of what is exemplified.

The term "include" shall be construed broadly, as if followed by "without limitation".

As used herein, a change in "orientation" of an object includes a change in position of the object. For example, two vectors with the same direction and sense, but with different points of origin, have different "orientations", as that term is used herein.

A parenthesis is simply to make text easier to read, by indicating a grouping of words. A parenthesis does not mean that the parenthetical material is optional or can be ignored.

A "processor" means one or more computer processors, at least some of which processors may be spatially remote from other processors.

A first object is "remote" from a second object if the first and second objects are physically separate from each other and the distance between the first and second objects is at least 0.1 meters.

Two values are "substantially" equal if they differ by less than 10%. Two values differ "substantially" if they differ by at least 10%. Two values x and y differ by a certain percent, if $[(x-y)/x] \times 100$ equals that certain percent, where x is the larger of the two values and y is the smaller of the two values.

To "visually display" a channel means to visually display content that is included in that channel. For example, a visual display of video content included in a television channel would comprise a visual display of that channel.

To "visually project" a channel means to visually project content that is included in that channel. For example, a projection of video content included in a television channel would comprise a visual projection of that channel.

Variations

This invention may be implemented in many different ways, in addition to those described above. Here are a few examples:

This invention may be implemented with different handheld devices, operating systems, hardware configurations and user interface designs.

Different form factors can be used for the handheld device. For example, the handheld device may comprise a toy for children that goes hand in hand with special programming for the children to explore and be active while watching TV. Or, for example, the handheld device may resemble binoculars, a magnifying glass, a rifle for first person shooter game, or goggles. Or, for example, the handheld device could be worn on a wrist or on a shoulder.

This invention is not limited to computer tablets, but may be implemented with other types of screens. For example, images may be displayed by one or more of the following:

television screens, wall- or ceiling mounted screens, computer monitors, cell phone and smart phone screens, screens of other handheld or mobile computing devices, head-mounted displays, and screens on table surfaces. Alternately, images may be projected onto a wall or other display surface.

In some implementations, multiple auxiliary screens or projections may be used. For example, in some embodiments, two peripheral screens may display images at the same time as the main screen.

In some implementations, the auxiliary screen is housed in a handheld or portable device. The device may include sensors (such as magnetometers, accelerometers, gyroscopes or other inertial measurement units) to detect motion (such as translation or rotation) orientation or position of the device. These detected motions, positions or orientations may be used to control the system.

Alternately, sensors may be housed separately from a display screen or projector. For example, a secondary screen may be in a fixed location, and sensors (such as magnetometers, accelerometers, gyroscopes or other inertial measurement units) may either (a) housed in a handheld device or (b) housed in a separate wearable form factor such as wrist band, glove or head-mounted device. These sensors may detect motion of the sensors. The detected motions may be used to control the system. For example, they may be used to control what is displayed by the fixed, secondary screen.

The handheld device may include means for communicating with one or processors. These means may include, for example, one or more of the following: (a) apparatus for wireless transmission, including transmitters, receivers, transceivers, antennae, digital or analog signal processors, and computers, and (b) apparatus for wired transmissions, including wires, cables, plugs, ports, digital or analog signal processors, and computers.

This invention may be implemented as a method comprising, in combination: (a) using one or more sensors to gather sensor data, (b) using one or more computer processors to process the sensor data to make an estimation of an orientation of a handheld device relative to a first display screen that is remote from the handheld device (or of a pattern of change of that orientation), and to select (based at least in part on that estimation) one or more particular channels of content, and (c) visually displaying the one or more particular channels on a second screen, which second screen is part of the handheld device. Furthermore: (1) the method may further comprise the step of audibly outputting at least one of the particular channels; (2) at least one of the particular channels may comprise a television channel; (3) at least some of the sensor data may be inertial data; (4) at least some of the sensor data may be magnetometer data, (5) the one or more sensors may include one or more gyroscopes, accelerometers or IMUs; (6) the one or more sensors may also include a camera; (7) the method may further comprise the step of using the first display screen to visually display a first channel of content, which first channel is different than the particular channels; (8) the method may further comprise the step of audibly outputting the first channel; (9) the first channel may comprise a television channel and at least one of the particular channels may comprise a different television channel; (10) different orientations of the handheld device relative to the first display screen may correspond to selections of different channels, respectively, out of the particular channels; (11) each of the different orientations may be along a line that intersects a different area, respectively, and each of the different areas may be located adjacent to the perimeter of the first display screen; (12) each of the particular channels, respectively, may display a different viewing angle; (13) at least a subset of the particular channels may each display a different portion of a specific scene, which specific scene is (or would be, if real) visible from a single vantage point that is the same for all of the subset, the different portions of the specific scene may each at a different viewing angle from the vantage point, and the different portions of the specific scene may overlap in part; (14) different orientations of the handheld device relative to a person holding the handheld device (or relative to a point at which the person is located) may correspond to different viewing angles relative to the vantage point; and (15) at least one of the computer processors may modifie an image from a feed to change a viewing angle or other apparent geometric property of the image.

This invention may be implemented as a method comprising, in combination: (a) accepting input that is indicative of a selection by a human, the selection being of one or more particular channels of content, and (b) visually displaying the one or more particular channels in a first area and simultaneously visually displaying an additional channel of content in a second area, wherein the first area is different than the second area, the second area is remote from a handheld device, the handheld device has an orientation relative to the second area, which orientation may change, and the selection is indicated by that orientation or by a pattern of change in that orientation. Furthermore: (1) the one or more particular channels may be visually projected onto the first area and the first area may be remote from the handheld device; and (2) the additional channel may be visually projected onto the second area.

This invention may be implemented as a handheld device comprising, in combination: (a) a first display screen, and (b) one or more processors adapted (or means for communicating with one or processors adapted): to accept sensor data indicative of measurements gathered by one or more sensors, to analyze the sensor data to make a calculation of an orientation of the handheld device relative to a second display screen, which second display screen is remote from the handheld device, and to select (based at least in part on the calculation) one or more channels of content to display on the first display screen. Furthermore, at least one of the sensors may be part of the handheld device.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:
1. A method comprising, in combination:
 (a) using one or more sensors to gather sensor data;
 (b) using one or more computer processors
  (i) to process the sensor data to make an estimation of an orientation of a handheld device, which orientation specifies a vertical angle and a horizontal angle of the handheld device relative to a particular location in the environment of the handheld device, and
  (ii) to select, based at least in part on that estimation, a first channel of content, such that which particular channel is selected as the first channel depends on the orientation relative to the particular location; and

(c) visually displaying the first channel on a first screen, while simultaneously displaying a second, different channel of content on a second screen, the first screen being part of the handheld device and the second screen being separate from the handheld device;

wherein the first and second channels comprise television channels or are streamed, transmitted over the Internet or broadcast.

2. The method of claim 1, wherein:
(a) the particular location has been determined by prior calibration; and
(b) the orientation is not merely a tilt, which tilt does not require the handheld device to be pointed at the particular location.

3. The method of claim 1, wherein, during a prior calibration step, a reference compass heading of the second screen is determined by a magnetometer onboard the handheld device taking magnetometer readings while the handheld device is pointed at the second screen and by the one or more processors analyzing visual data to identify a visual tag that is at or adjacent to the second screen, the visual data being captured by a camera mounted in the handheld device.

4. The method of claim 1, wherein the method further comprises:
(a) a zoom out step in which the first screen displays a view that drops back revealing a plurality of windows; and
(b) a zoom in step in which the first screen displays a view that zooms in to center on an item selected by a user after the zoom out step.

5. The method of claim 1, wherein the first screen displays a feed and simultaneously displays an icon that shows where a camera supplying the feed is located.

6. The method of claim 1, wherein:
(a) the first screen displays a virtual view from the vantage point of a player of a video game; and
(b) the second screen displays a channel that is accessible to other players of the video game.

7. The method of claim 1, wherein:
(a) the first screen displays a first image and the second screen simultaneously displays a second image; and
(b) the first image extends the second image beyond the frame of the second screen, such that the first and second images depict non-overlapping portions of a single scene as seen from a single observation point.

8. The method of claim 1, wherein the vertical angle is tilt and the horizontal angle is compass heading.

9. The method of claim 1, wherein:
(a) the first screen displays a first image and the second screen simultaneously displays a second image; and
(b) the second image displays a main plot and the first image displays an additional subplot.

10. The method of claim 1, wherein the first channel comprises a television channel and the second channel comprises a different television channel.

11. The method of claim 1, wherein different orientations of the handheld device relative to the second display screen correspond to selections of different channels, respectively.

12. The method of claim 11, wherein each of the different orientations is along a line that intersects a different area, respectively, and each of the different areas is located outside of and adjacent to the perimeter of the second display screen.

13. The method of claim 11, wherein each of the different channels, respectively, displays different viewing angle.

14. The method of claim 11, wherein:
(a) at least a subset of the different channels each display a different portion of a specific scene, which specific scene is, or would be if real, visible from a single vantage point that is the same for all of the subset; and
(b) the different portions of the specific scene are each at a different viewing angle from the vantage point.

15. The method of claim 1, wherein at least one of the computer processors modifies an image from a feed to change a viewing angle or other apparent geometric property of the image.

16. A method comprising, in combination:
(a) visually displaying a first channel of content in a first area and simultaneously visually displaying a second channel of content in a second area, the first area being a screen that is part of a handheld device and the second area being separate from the handheld device, and the first and second channels being different from each other;
(b) using one or more sensors to gather sensor data; and
(c) using one or more processors
(i) to process the sensor data to determine an orientation of the handheld device, which orientation specifies a vertical angle and a horizontal angle of the handheld device relative to a particular location in the environment of the handheld device; and
(ii) to select which particular channel to display as the first channel, such that which particular channel is selected to display as the first channel depends on the orientation of the handheld device relative to the particular location;

wherein the first and second channels comprise television channels or are streamed, transmitted over the Internet or broadcast.

17. The method of claim 16, wherein the one or more particular channels are visually projected onto the second area and the second area is remote from the handheld device.

18. A handheld device comprising, in combination:
(a) a first display screen for visually displaying a first channel;
(b) one or more sensors onboard the handheld device, which sensors include a magnetometer; and
(c) one or more processors adapted, or means for communicating with one or processors adapted,
(i) to analyze data gathered by the one or more sensors to determine orientation of the handheld device, and
(ii) to select which channel to visually display as the first channel, such that
(A) which channel is selected to display as the first channel depends on orientation of the handheld device, which orientation specifies a vertical angle and a horizontal angle of the handheld device relative to a particular location in the environment of the handheld device, which location is at or adjacent to a perimeter of a second visual display screen, the second screen being separate from the handheld device, and
(B) the first channel is displayed by the first display screen while the second display screen displays a second channel;

wherein the first and second channels comprise television channels or are streamed, transmitted over the Internet or broadcast.

19. The method of claim 16, wherein selection of the first channel occurs when the handheld device is pointed towards a location that is outside of and adjacent to the second display screen.

20. The method of claim 16, wherein, during a prior calibration step, a reference compass heading of the second screen is determined by a magnetometer onboard the handheld device taking magnetometer readings while the handheld device is pointed at the second screen and by the one or more processors analyzing visual data to identify a visual tag that is at or adjacent to the second screen, the visual data being captured by a camera mounted in the handheld device.

* * * * *